United States Patent
Yu et al.

(10) Patent No.: US 7,764,717 B1
(45) Date of Patent: Jul. 27, 2010

(54) RAPID DATARATE ESTIMATION FOR A DATA STREAM MULTIPLEXER

(75) Inventors: James J. Yu, San Jose, CA (US); Sebastian Turullols, Los Altos, CA (US); Aly E. Orady, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1474 days.

(21) Appl. No.: 11/123,820

(22) Filed: May 6, 2005

(51) Int. Cl.
*H04J 3/02* (2006.01)

(52) U.S. Cl. .................... 370/537; 370/271

(58) Field of Classification Search ............. 370/390, 370/401, 229, 537, 352, 338, 389; 382/190; 707/3; 725/41, 37; 386/46; 395/650; 380/271
See application file for complete search history.

(56) References Cited

U.S. PATENT DOCUMENTS

| | | | |
|---|---|---|---|
| 5,537,595 A * | 7/1996 | Sakata .................... | 718/105 |
| 5,553,021 A | 9/1996 | Kubono et al. | |
| 6,754,241 B1 | 6/2004 | Krishnamurthy et al. | |
| 7,158,676 B1 * | 1/2007 | Rainsford ................ | 382/190 |
| 2001/0009547 A1 * | 7/2001 | Jinzaki et al. ............ | 370/390 |
| 2002/0078446 A1 * | 6/2002 | Dakss et al. .............. | 725/37 |
| 2003/0159143 A1 * | 8/2003 | Chan ....................... | 725/41 |
| 2004/0001592 A1 * | 1/2004 | Akiwumi-Assani et al. | 380/271 |
| 2004/0002969 A1 * | 1/2004 | Perng et al. ............... | 707/3 |
| 2004/0233938 A1 * | 11/2004 | Yamauchi ................ | 370/537 |
| 2005/0058134 A1 * | 3/2005 | Levi et al. ................ | 370/389 |
| 2005/0259946 A1 * | 11/2005 | Kitamura ................ | 386/46 |
| 2006/0221821 A1 * | 10/2006 | Martinez Ransom et al. | 370/229 |

OTHER PUBLICATIONS

"Narrowcast Services Gateway™"; printed from the internet: www.harmonicinc.com/view_csd_product_group.cfm?classID=1040; 2 pages.
"Narrowcast Services Gateway™ NSG 8000 Family"; printed from the internet: www.harmonicinc.com/stageone/files/harmonic/collateral/NSG%F8000%5Ffamily%5Fv05%2DO2%5FRS%2Epdf; 4 pages.

(Continued)

*Primary Examiner*—Kwang B Yao
*Assistant Examiner*—Syed Bokhari
(74) *Attorney, Agent, or Firm*—Meyertons Hood Kivlin Kowert & Goetzel, P.C.; Jeffrey C. Hood; Mark K. Brightwell (57) ABSTRACT

A multiplexing system having an input unit, a storage unit and control unit. The input unit receives data units corresponding to multiple source data streams and extracts packets from the data units. The control unit computes data rate estimates for the source data streams based on timestamps in the source data streams. The storage unit stores a packet count and previous timestamp value for each source data stream. The control unit computes a preliminary data rate estimate for a source data stream based on samples of a local clock if timestamps are not received promptly. The control unit also computes scheduling rates based on the data rate estimates. The scheduling rates are used to control the rates of allocation of data from the source data streams into a multiplexed output stream. The control unit computes scheduling rates in a way that avoids oversubscription of the output channel.

20 Claims, 7 Drawing Sheets

OTHER PUBLICATIONS

Narrowcast Services Gateway™ NSG Family; printed from the internet: www.harmonicinc.com/stageone/files/harmonic/collateral/NSG%Fv03%2D09%FRS%2Epdf; 4 pages.

"Model D9479 Gigabit QAM Modulator"; Scientific Atlanta; printed from the internet: www.sciatl.com/customers/Source/4005270.pdf; 3 pages.

"SEM SmartStream Encryptor Modulator"; Motorola; printed from the internet: http://broadband.motorola.com/catalog/product_documents/SEM_nov02.pdf; 2 pages.

"CISCO UMG9850 QAM Module"; printed from the internet: www.cisco.com/en/US/products/hw/video/ps5648/5649/; 2 pages.

Cisco uMG9850. QAM Module Data Sheet; printed from the internet: http://www.cisco.com/warp/public/cc/pd/mxsv/prodlit/9850d_ds.pdf; Cisco uMG9850 QAM Module; 4 pages.

Didier Le Gall; "MPEG: A Video Compression Standard for Multimedia Applications"; Communications of the ACM; Apr. 1991; pp. 47-58; vol. 34, No. 4.

"DTA-120—DVB/ASI Input Adapter for PCI Bus"; Data Sheet; Jul. 2003; 30 pages; DekTec Digital Video B.V.; Retrieved from the Internet: http://www.dektec.com/Products/DTA-120/Downloads/DTA-120.pdf.

* cited by examiner

RAPID DATARATE ESTIMATION FOR A DATA STREAM MULTIPLEXER

BACKGROUND OF THE INVENTION

1. Field of the Invention

This invention is related to the field of multiplexing hardware, and more particularly, to hardware devices for multiplexing packetized video streams.

2. Description of the Related Art

There exists a significant demand for systems capable of multiplexing video streams such as (MPEG transport streams) onto an output channel. Such systems require estimates of the input data rate of the video streams in order to operate efficiently. The estimation of input data rates for the video streams may be performed in software. However, software based data rate estimation is slow. Thus, there exists a need for hardware based mechanism for estimating the input data rates of video streams.

SUMMARY

In one set of embodiments, a multiplexing system may include an input unit, a storage unit and a control unit. The input unit may be configured to receive a sequence of data units corresponding to a plurality of source data streams, to extract packets of the source data streams from the data units, to extract a timestamp value from each packet that contains a timestamp field, to assert a packet indication signal for each packet, and to generate a stream identifier for each packet that identifies the source data stream to which the packet belongs.

The storage unit may be configured to store a number of data records. Each data record may be configured to store information associated with a corresponding one of the source data streams. Each data record includes at least a count field and a timestamp field. The count field of each data record is configured to store a value representing a number of packets of the corresponding source data stream that have been received since a packet containing a timestamp was received.

The control unit may be configured to compute a data rate estimate for a first of the source data streams in response to a determination that a current packet contains a second of two consecutive timestamp values corresponding to the first source data stream. The control unit may be configured to compute the data rate estimate based on (a) the value of the count field corresponding to the first source data stream, (b) a first of the two consecutive timestamp values stored in the timestamp field corresponding to the first source data stream, and (c) the second timestamp value from the current packet.

The data rate estimate is usable to determine a rate of allocation of packets from the first source data stream into a multiplexed output stream which is to be transmitted onto an output channel. The source data streams may be MPEG-2 transport streams. The timestamp values may be program clock reference (PCR) timestamps.

The control unit may be configured to store the timestamp values corresponding to the first source data stream into the timestamp field of the corresponding data record at least until the data rate estimate has been computed.

The control unit may be configured to increment the count field of the data record corresponding to the first source data stream in response to receiving each packet of the first source data stream. Furthermore, the control unit is configured to reinitialize the value of the count field in response to a determination that the value of the count field reached a predetermined maximum value.

In one embodiment, the control unit may be configured to verify that the count value exceeds a minimum value before computing the data rate estimate.

The control unit may be configured to compute a scheduling rate for the first source data stream in response to having computed the data rate estimate. The scheduling rate may be used to control the rate of allocation of packets from the first source data stream into the multiplexed output stream.

In one embodiment, the control unit may be configured to compute the scheduling rate for the first source data stream according to the relations:

$$PUD = AggRate_{j-1} - SRate_{j-1}(k) + DRE(k),$$

$$SRate_j(k) = (PUD \geq Thresh)?R_{LOW}:DRE(k),$$

where PUD is a provisional update value for the aggregate rate of the output channel;

where $AggRate_{j-1}$ is a previous aggregate rate of the output channel, where $SRate_{j-1}(k)$ is a previous scheduling rate for the first source data stream, where $DRE(k)$ is the data rate estimate for the first source data stream, where Thresh is a rate threshold value;

where $R_{LOW}$ is a low rate value constant, where $SRate_j(k)$ is the scheduling rate for the first source data stream.

The notation "A=L?B:C" is a short hand for "A=B if L is True and A=C if L is False".

Furthermore, the control unit may be configured to compute an updated aggregate rate for the output channel based on the relations:

$$U = AggRate_{j-1} - SRate_{j-1}(k) + R_{LOW}$$

$$AggRate_j = (PUD \geq Threshold)?U:PUD,$$

where U is an alternative update value for the aggregate rate of the output channel.

In some embodiments, the control unit is configured to reset the count value corresponding the first source data stream to an initial value in response to a determination that a type of the current packet differs from a type associated with the first data stream. A type difference may indicate a change in rate of the source data stream, e.g., associated with a change from normal play to fast forward or reverse.

The multiplexing system may also include a local clock. The control unit may be configured to compute a temporary data rate estimate for the first source data stream based on samples of a local clock in response to a determination that the count value for the first source data stream has reached a predetermined number.

The action of "sampling the local clock" refers to a sampling a counter that is being driven by the local clock.

In one embodiment, the control unit may be configured to store a first local timestamp, derived from a first sample of the local clock, into the timestamp field corresponding to the first source data stream, in response to an indication that the count value for the first source data stream equals zero. Furthermore, the control unit may be configured to:

generate a second local timestamp, derived from a second sample of the local clock, in response a determination that the count value for the first source data stream has reached the predetermined number; and compute the temporary data rate estimate based on the first local timestamp, the second local timestamp and the count value for the first source data stream.

The multiplexing system may also include a scheduler, a set of input FIFOs, and an output FIFO. Each of the input FIFOs may store packets of a corresponding one of the source data streams. The scheduler may be configured to read packets from each of the input FIFOs and store the packets into the output FIFO to form the multiplexed output stream.

The multiplexing system may also include a transmit unit configured to transmit the multiplexed output stream from the output FIFO onto the output channel. The output channel may be a quadrature amplitude modulation (QAM) output channel.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
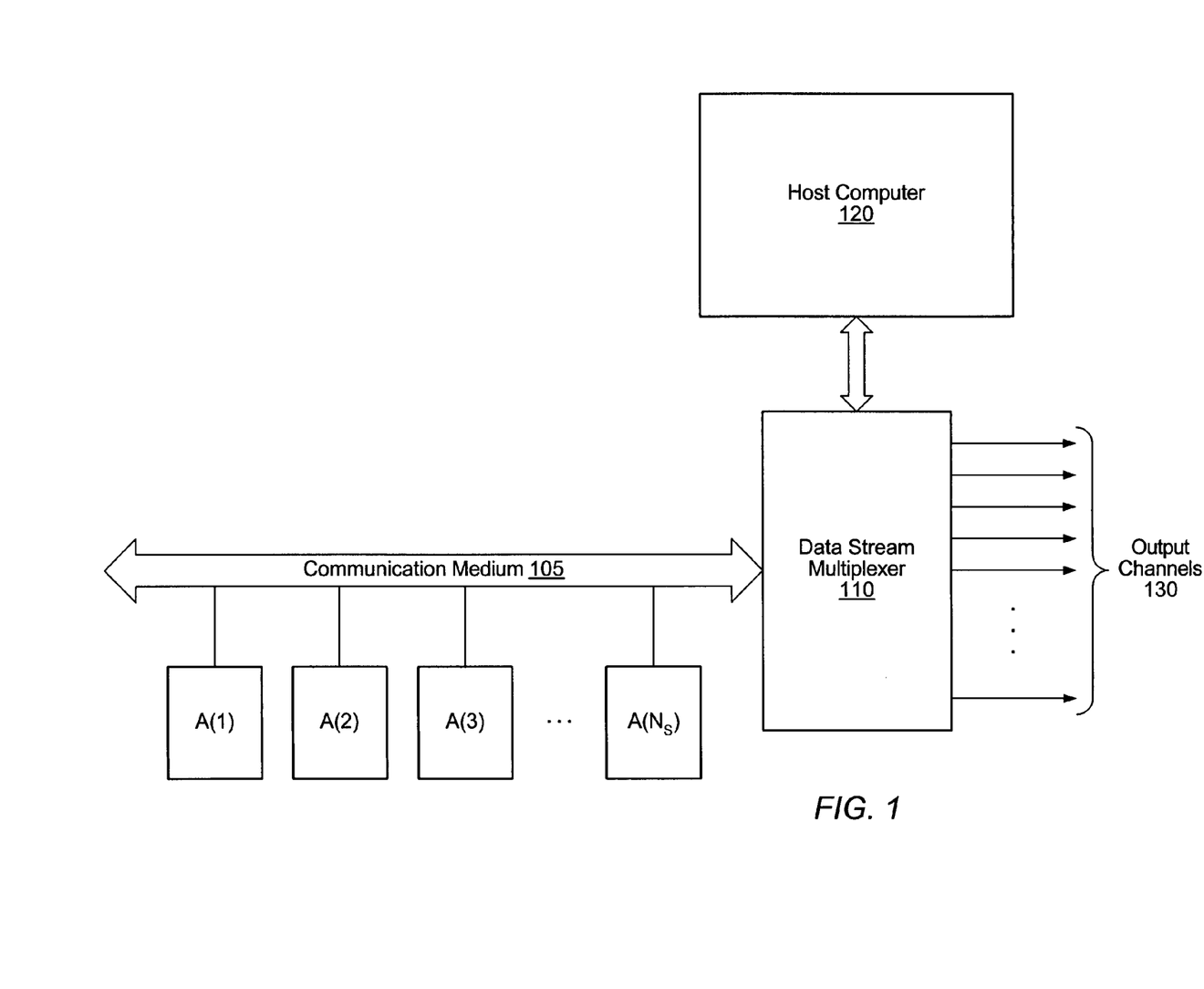
FIG. 1 illustrates one embodiment of a system, including a data stream multiplexer 110, for delivering data streams to user devices coupled to various one of the output channels.

A set of devices $A(1)$, $A(2)$, ..., $A(N_S)$, where $N_S$ is a positive integer, may be configured to transfer data to data stream multiplexer 110 through communication medium 105 as suggested by FIG. 1. In particular, each device $A(k)$, $k=1$, 2, ..., $N_S$, is configured to transfer a sequence $C(k)$ of data units (e.g., Internet Protocol datagrams) to the multiplexer 110 through the communication medium 105.

The communication medium 105 may be configured according to a protocol that allows only one agent to communicate at any given time. Thus, the multiplexer 110 may receive a composite sequence of data units representing a time-multiplexed mixture of the data units of the sequences $C(1)$, $C(2)$, ..., $C(N_S)$.

Each device $A(k)$, $k=1$, 2, ..., $N_S$, may be configured to receive a source data stream (e.g., an MPEG-2 transport stream) generated by a data source (e.g., an MPEG-2 encoder) and embed the packets of the source data stream into the data units of sequence $C(k)$. Each data unit may include a number of packets.

In one alternative embodiment, each device $A(k)$, $k=1, 2, ..., N_S$, may be configured to receive one or more source data streams from one or more data sources and embed the packets of the one or more source data streams into the data units of sequence $C(k)$. Thus, a given data unit may include packets from one or more source data streams.

The data stream multiplexer 110 is configured for coupling to the communication medium 105 and to a set 130 of output channels as illustrated in FIG. 1.

The data stream multiplexer 110 multiplexes subsets of the source data streams onto respective ones of the output channels 130. In other words, a first subset of the source data streams are combined to form a first output stream which is transmitted onto a first of the output channels; a second subset of the source data streams are combined to form a second output stream which is transmitted onto a second of the output channels; and so forth.

In one set of embodiments, the communication medium 105 is an Ethernet bus (e.g., a 10 Gigabit Ethernet bus) and the output channels are quadrature amplitude modulation (QAM) channels. However, it is contemplated that other technologies may be used to realize the communication medium and/or the output channels.

Each of the output channels may couple to a number of data sinks (not shown). The data sinks may include MPEG-2 decoders.

Each data sink may be configured to (a) receive the multiplexed output stream from the output channel to which it is coupled and (b) extract packets corresponding to one of the source data streams from the multiplexed output stream.

In some embodiments, the multiplexer 110 may be used to supply video on demand to users. For example, a set of users whose decoder boxes are coupled to a given output channel may select respective programs they are interested in viewing from a set of available programs (e.g., movies). The multiplexer 110 may be configured to multiplex the source data streams (e.g., the MPEG-2 transport streams) representing the selected programs onto the given output channel. Each user's decoder box may extract the packets of a corresponding one of the source data streams from the multiplexed stream and generate a video stream from the extracted packets. The video stream may be used to drive a display device (such as a television, a projector, a head mounted display, a computer display, etc.) which is coupled to the decoder box.

The multiplexer 110 may be configured for coupling to a host computer 120. The host computer may be configured to execute software that performs management functions such as initialization, error reporting, etc.

Figure 2:
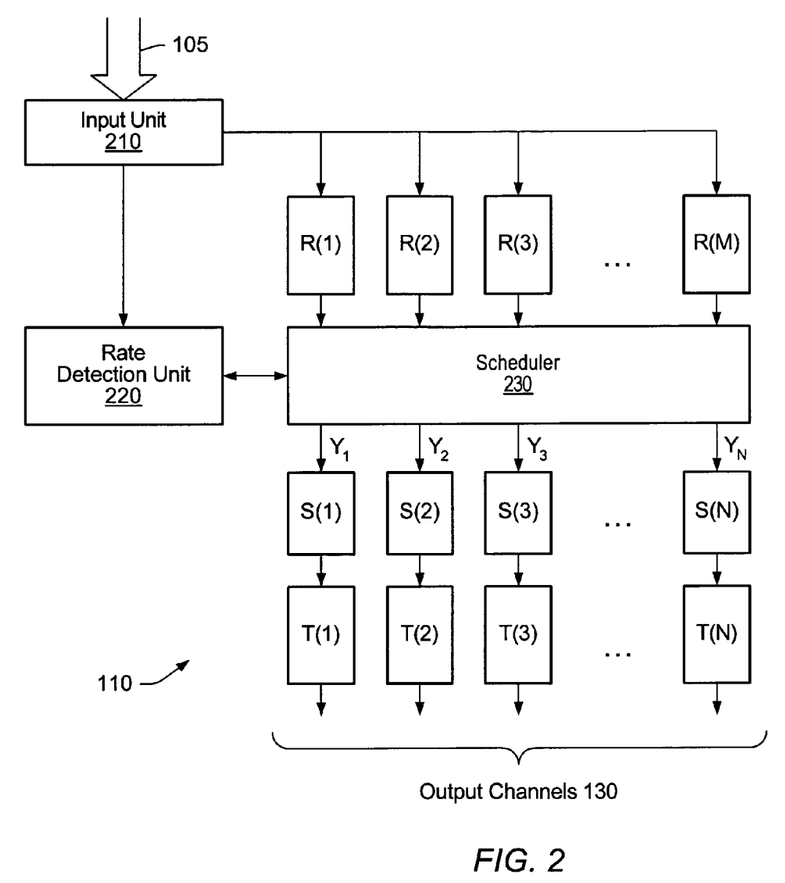
FIG. 2 illustrates one embodiment of the data stream multiplexer 110 including an input unit 210, a rate detection unit 220, a set of input FIFOs, a scheduler 230 and a set of output FIFOs.

FIG. 2 is a block diagram of multiplexer 110 according to one set of embodiments. The multiplexer 110 may include:

an input unit 210;

a rate detection unit 220;

a set of M input FIFOs denoted as R(1), R(2), . . . , R(M);
a scheduler 230;
a set of N output FIFOs denoted as S(1), S(2), . . . , S(N); and
a set of N transmit units denoted as T(1), T(2), . . . , T(N).

In some embodiments, input unit 210 and rate detection unit 220 are configured on the same integrated circuit. In one embodiment, the input unit 210, the rate detection unit 220, the input FIFOs R(1), R(2), . . . , R(M), and the scheduler 230 are configured to the same integrated circuit.

The integer M is greater than one.

The integer N is greater than or equal to one.

A wide variety of embodiments are contemplated where M and N take different sets of integer values.

In one embodiment, M equals 4096 and N equals 256.

The input unit 210 receives a composite sequence of data units representing a time-multiplexed mixture of the data units of sequences C(1), C(2), . . . , C($N_S$).

The input unit 210 may examine each received data unit, determine the source data stream X to which the data unit belongs (e.g., based on information embedded in the header of the data unit), extract packets from the data unit, and store the extracted packets into one of the input FIFOs R(1), R(2), . . . , R(M), i.e., the input FIFO that has been allocated to stream X.

When a new source data stream is encountered, an available one of the input FIFOs may be allocated to the new source data stream. When an existing source data stream is concluded, the input FIFO that has been allocated to that stream may be deallocated and returned to the available list.

The scheduler 230 is configured to read packets from the input FIFOs R(1), R(2), . . . , R(M) and store the packets into the output FIFOs S(1), S(2), . . . , S(N).

In one set of embodiments, the packets from each input FIFO are stored into a selected one of the output FIFOs. The host computer 120 may provide control information which specifies a function f from the set {1, 2, . . . , M} to the set {1, 2, . . . , N}. The packets from input FIFO R(k), k=1, 2, . . . , M, may be stored into the output FIFO S(f(k)). Of course, some of the input FIFOs may be inactive (i.e., not allocated to a source data stream). Thus, the domain of the function f may be a proper subset of the set {1, 2, . . . , M}.

The packets written into output FIFO S(n), n=1, 2, . . . , N, form an output stream $Y_n$. The transmit unit T(n) reads the packets of output stream $Y_n$ from output FIFO S(n) and transmits the packets onto a corresponding one of the output channels. Thus, the scheduler 230 generates N output streams, and the transmit units transmit the N output streams onto N respective output channels.

The rate detection unit 220 couples to input unit 210 and scheduler 230.

The rate detection unit 220 is configured to compute estimates of the input data rate for each of the source data streams. Furthermore, the rate detection unit 220 is configured to determine scheduling rates for the source data streams based on the data rate estimates. The scheduling rate for a given source data stream is a recommendation on the rate at which the scheduler 230 should drain data (by reading) from the corresponding input FIFO R(k) and write the data into the assigned output FIFO S(f(k)).

The rate detection unit 220 transfers the scheduling rates (or, values derived from the scheduling rates) for the source data streams to the scheduler 230.

The scheduler 230 (or alternatively, the rate detection unit) includes a memory $L_A$ for storing an aggregate rate value AggRate(q) for each output channel $CH_q$, q=1, 2, . . . , N. The aggregate rate value AggRate(q) represents the sum of the scheduling rates of the source data streams that have been assigned to output channel $CH_q$. All aggregate rates are initialized to zero at system startup.

After having computed a data rate estimate for a source data stream $X_k$ corresponding to input FIFO R(k), k=1, 2, . . . , M, the rate detection unit 230 may perform the computations described below to generate a scheduling rate for the source data stream $X_k$ and to compute an update for the aggregate rate of output channel $CH_{f(k)}$, i.e., the output channel to which the source data stream $X_k$ has been assigned.

The rate detection unit may compute a provisional update (PUD) for the aggregate rate of the output channel $CH_{f(k)}$ according to the relation:

$$PUD(f(k))=AggRate_{j-1}(f(k))-SRate_{j-1}(k)+DRE(k),$$

where PUD(f(k)) is the provisional update to the aggregate rate for the output channel $CH_{f(k)}$, where $AggRate_{j-1}(f(k))$ is the previous aggregate rate value for the output channel $CH_{f(k)}$, where $SRate_{j-1}(k)$ is a previous scheduling rate for the source data stream $X_k$, where DRE(k) is the current data rate estimate for the source data stream $X_k$.

At various places in herein, notation such as PUD(f(k)) and $AggRate_{j-1}(f(k))$ may be simplified by dropping the output channel indication "f(k)" when the context makes it clear which output channel is being referred to, thus obtaining, e.g., PUD and $AggRate_{j-1}$. Furthermore, notation such as $SRate_j(k)$ and $SRate_{j-1}(k)$ may be simplified by dropping the input channel indication "k" when the context makes it clear which input channel is being referred to (thus obtaining, e.g., $SRate_j$ and $SRate_{j-1}$).

Note: The previous scheduling rate $SRate_{j-1}(k)$ will be zero (having been initialized to zero) if the current data rate estimate is the first data rate estimate for a new source data stream.

The rate detection unit 220 compares the provisional update PUD(f(k)) to a rate threshold value. If PUD(f(k)) is less than the rate threshold value, the rate detection unit 230 sets the actual update for the aggregate rate of output channel $CH_{f(k)}$ equal to the provisional update, i.e., $$AggRate_j(f(k)) \leftarrow PUD(f(k)),$$

and sets the current scheduling rate for stream $X_k$ equal to the current data rate estimate, i.e., $$SRate_j(k) \leftarrow DRE(k).$$

The rate threshold value may be set equal to $MOR_{f(k)}-(M-1)R_{LOW}$, where $MOR_{f(k)}$ is the maximum output rate supported by the output channel $CH_{f(k)}$, M is the number of input channels (i.e., input FIFOs), and $R_{LOW}$ is a predefined constant rate that is much smaller than the rate of an active source data stream. For example, in one embodiment, $R_{LOW}$ equals 25000 bps. In another embodiment, $R_{LOW}$ may be set equal to zero.

In contrast, if the provisional update PUD(f(k)) is greater than or equal to the rate threshold value, the actual update for the aggregate rate of output channel $CH_{f(k)}$ is set equal to an alternative update value $U=AggRate_{j-1}(f(k))-SRate_{j-1}(k)+R_{LOW}$, i.e., $$AggRate_j(f(k)) \leftarrow AggRate_{j-1}(f(k))-SRate_{j-1}(k)+R_{LOW},$$

and the current scheduling rate $SRate_j(k)$ for stream $X_k$ is set equal to $R_{LOW}$, i.e., $$SRate_j(k) \leftarrow R_{LOW}.$$

The later assignment induces the scheduler 230 to drain the input FIFO R(k) at the rate $R_{LOW}$. Thus, the input FIFO R(k) will eventually overflow. In response to the overflow, the scheduler may send an interrupt to the host computer 120 informing host software of the overflow. Host software may intervene to perform a correction action (e.g., to shut down the corresponding source data stream $X_k$).

Suppose that a set of source data streams are assigned to an output channel $CH_q$ and that the aggregate rate of the output channel (based on the scheduling rates of the set of source data streams) is below the rate threshold value. Suppose further that a new source data stream is assigned to the output channel. When the rate detection unit makes its first data rate estimate for the new source data stream, it is possible that this data rate estimate may send the provisional update PUD(q) over the rate threshold value. According to the policy described above, the new source data stream will be assigned a scheduling rate equal to the rate $R_{LOW}$ and the aggregate rate will be incremented by $R_{LOW}$. Because the rate threshold value is equal to $MOR_q-(M-1)R_{LOW}$, the new aggregate rate will still be less than or equal to $MOR_q$. Thus, the first set of source data streams will continue to flow unperturbed while the new source data stream will eventually be shut down (by a host software mechanism) when the input FIFO for the new stream overflows.

In a worst case scenario, suppose that an output channel $CH_q$ has a single assigned stream with data rate equal to the rate threshold value (Thresh) minus epsilon (i.e., a very small positive value). Since this is the only stream assigned to the output channel, the aggregate rate for the output channel is also equal to Thresh minus epsilon. Now suppose that (M−1) additional streams arrive in rapid succession, all of them being assigned to same output channel $CH_q$. Each of the additional streams will satisfy the condition PUD(q)≧Thresh, and thus, be assigned scheduling rate $R_{LOW}$. Also, the aggregate rate will increase by $(M-1)R_{LOW}$ as a result of the additional streams. However, because Thresh is equal to $MOR_q-(M-1)R_{LOW}$, the final aggregate rate will still be less than or equal to $MOR_q$.

As described above, the input unit 210 extracts packets from the data units of the composite sequence. In addition, the input unit 210 examines each packet to determine if the packet contains a timestamp field, e.g., a program clock reference (PCR) field as defined by the ISO/IEC 13818-1 specification for MPEG-2. If the packet contains a timestamp field, the input unit 210 extracts the timestamp value (e.g., PCR value) from the timestamp field.

For each packet extracted from each received data unit, the input unit 210 may:

assert a packet indicator (PI) signal informing the rate detection unit 220 that the packet has been extracted;

assert a timestamp present signal (TP) if the packet contains a timestamp field;

send the timestamp value ($TS_{pkt}$) from the packet to the rate detection unit 220, if the packet contains a timestamp field;

send a discontinuity indicator (DI) value to the rate detection unit 220 indicating whether or not the current packet represents a discontinuity in the source data stream to which the packet belongs;

send a stream identifier (ID) to the rate detection unit 220 identifying the source data stream to which the packet belongs;

send a type indicator to the rate detection unit 220 indicating one of a number of different types associated with the current data unit, e.g., types such as normal play, fast forward, 2× fast forward, reverse, 2× reverse, etc.

The rate detection unit 220 may estimate the data rate (e.g., bit rate) for a source data stream based on the timestamp values embedded in the source data stream.

In one set of embodiments, the rate detection unit 220 may be configured to estimate the data rate for each source data stream based on (a) the difference between two successive timestamps occurring in the source data stream and (b) a count of the number of packets occurring in the source data stream between the two successive timestamps.

When a new source data stream is received by the multiplexer 110, it is desirable for the rate detection unit 220 to produce an estimate of the data rate of the new source data stream before the corresponding input FIFO (i.e., the input FIFO that has been allocated to the new source data stream) has a chance to overflow. Thus, rate detection unit 220 may be configured to generate an estimate of the data rate for a new source data stream based on samples of a local clock (internal to the multiplexer 110) in the case that a timestamp is not detected in the source data stream within a predefined number of packets. When the rate detection unit 220 eventually acquires two successive timestamps from the new source data stream, the rate detection unit 220 may generate another data rate estimate based on the two successive timestamps. Each data rate estimate induces the generation of an aggregate rate value and a scheduling rate as described above.

The data rate estimate based on local clock samples may not be as accurate as the data rate estimate based on the timestamps. However, the former data rate estimate may be sufficiently accurate for use in the short term until the later data rate estimate becomes available.

Figure 3:
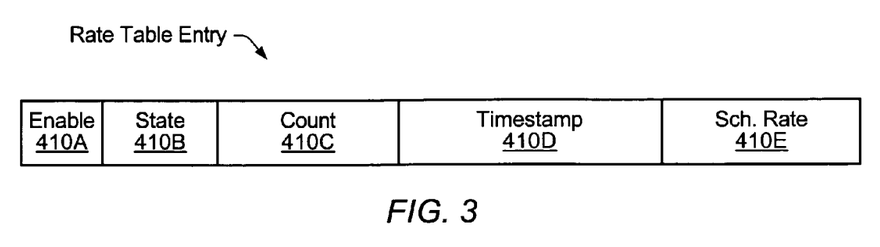
FIG. 3 illustrates one embodiment for the structure of data record in a rate data table.

The rate detection unit 220 may rely on a rate data table (e.g., see rate data table 620 of FIG. 6) to perform its rate estimation functions. The rate data table may include a number of data records. The data records may be allocated to source data streams as they are encountered. In one embodiment, each data record may include the following items, as illustrated in FIG. 3:

an enable bit 410A, controlled by host software that executes on host computer 120, indicating whether rate estimation has been enabled for the corresponding source data stream;

a state field 410B containing state information for the rate estimation algorithm with respect to the corresponding source data stream;

a count field 410C indicating a count of packets in the corresponding source data stream;

a timestamp field 410D configured to store a timestamp value;

a scheduling rate field 410E configured to store a scheduling rate value.

For example, in one embodiment, the state field 410B is 2 bits long, the count field is 12 bits long, the timestamp field is 42 bits long, and the scheduling rate field is 26 bits long. However, a variety of other bit lengths are possible for each of these fields.

Figure 4:
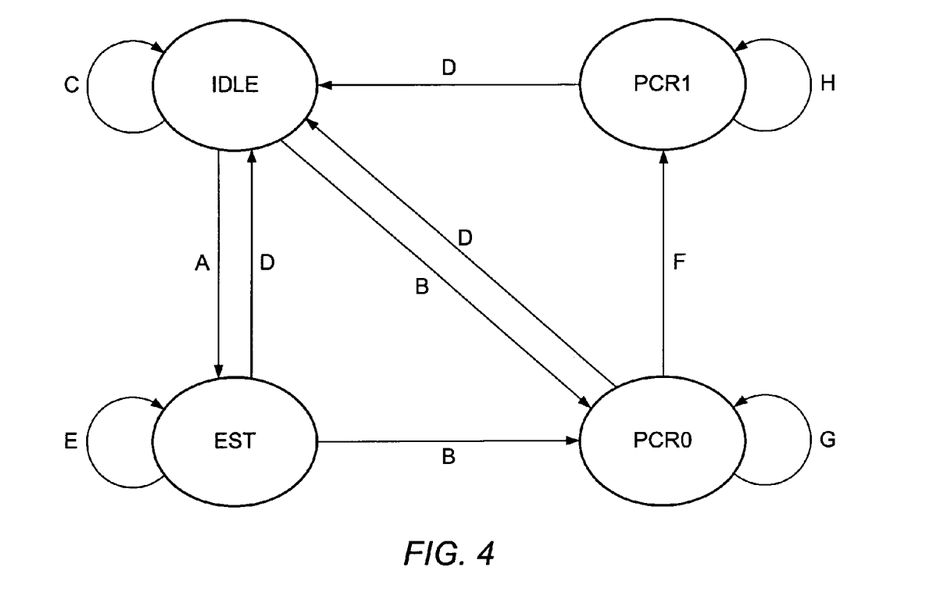
FIG. 4 is a state diagram for one embodiment of a control algorithm configured to compute data rate estimates for the source data streams.

The rate detection unit 220 may be configured to estimate the data rate for each of the source data streams according to the state diagram illustrated in FIG. 4.

When a new source data stream $X_k$ is encountered, host software executing on the host computer 120 may allocate a data record in the rate data table. The state value (i.e., the value of the state field 410B) is initially equal to IDLE. (Thus, the rate detection unit 220 starts in the IDLE state.) The count field 410C and the rate field 410E are initially equal to zero.

In the IDLE state, the rate detection unit 220 may increment the count value for each received packet of the stream $X_k$. If a packet containing a timestamp value is received, the timestamp value is stored in the timestamp field 410D, the state value is set to PCR0 (indicating that a timestamp has been detected), and the count value is reset to one. Thus, for the next received packet of stream $X_k$, the rate detection unit 220 will be in state PCR0.

In state PCR0, the rate detection unit 220 may increment the count value for each received packet of stream $X_k$. If a packet containing a timestamp value is received, the rate detection unit computes an estimate of the data rate for stream $X_k$, sets the count value to one, and sets the state value to PCR1. Thus, the rate detection unit 220 will be in the PCR1 state when the next packet of stream $X_k$ is received.

The rate detection unit 200 computes the data rate estimate for stream $X_k$ based on (a) the timestamp $TS_{pkt}$ of the presently received packet, (b) the previous timestamp $TS_0$ that was stored into the timestamp field 410D during the IDLE state, and (c) the current value of the count field 410C. For example, the data rate estimate for stream $X_k$ may be computed according to the expression:

$$DRE(k)=R_S*G*Count(k)/(TS_{pkt}-TS_0),$$

where $R_S$ is the clock rate of the source clock that generated the timestamps in the stream $X_k$, G is the number bits per packet, Count(k) is the count value for stream $X_k$. In one embodiment, $R_S$=27 MHz and G=1504 bits/packet.

As described above, in state PCR0, the rate detection unit may perform a set $S_{01}$ of operations including (a) computing an estimate for the data rate of stream $X_k$, (b) setting the count value to one, and (c) setting the state value to PCR1, in response to receiving a timestamp-bearing packet P. In some embodiments, the set $S_{01}$ of operations may be inhibited if the packet P corresponds to a discontinuity in stream X. Recall that input unit 210 provides a discontinuity indicator (DI) per packet to the rate detection unit 220. If the packet P corresponds to a discontinuity (as indicated by the condition DI=True), the rate detection unit may set the count value to one and store the timestamp from the packet P in the timestamp field 410D.

Furthermore, the set $S_{01}$ of operations may be inhibited if the count value is not sufficiently large, i.e., if the count value is not greater than a predefined value integer $N_{MIN}$. The value $N_{MIN}$ is programmable. In one embodiment, $N_{MIN}$ is set equal to 16.

In state PCR1, the rate detection unit 220 may monitor the stream $X_k$ to ensure that timestamp-bearing packets are received on a regular basis. For example, the rate detection unit 220 may increment the count value for each received packet of stream $X_k$. If a packet containing a timestamp value is received, the count value is set to one. If the count value reaches a predefined value $N_{MAX}$, the rate detection unit 220 sets the state value to IDLE, sets the count value to zero, and notifies the host computer 120 (e.g., by asserting a CPU interrupt) that an "packet missed" error has occurred.

$N_{MAX}$ is set to a value that is larger than the number of packets that occur between successive timestamp-bearing packets under normal conditions. The value $N_{MAX}$ is programmable. In one set of embodiments, $N_{MAX}$ may be set equal to 256.

As described above, the rate detection unit 220 may generate an estimate of the data rate for stream $X_k$ based on samples of a local clock if a timestamp-bearing packet is not received within a certain number of packets. To implement this functionality, the rate detection unit 220 may perform the following operations in the IDLE state.

(A) The rate detection unit compares the count value to zero. If the count value equals zero, the rate detection unit reads the value $L_0$ of a local clock, i.e., a clock internal to the multiplexer 110, and stores the value $L_0$ into the timestamp field 410D of the data record corresponding to stream $X_k$. Thus, the read and store operation occurs for the first received packet of the stream $X_k$.

(B) The rate detection unit 220 may determine if the count value equals a predetermined integer value such as $N_{BUF}/2$, where $N_{BUF}$ is the depth of the input FIFO corresponding to stream $X_k$. In one embodiment, $N_{BUF}$=512.

(C) If the rate detection unit 220 determines that the count value equals the predetermined value and the current packet does not contain a timestamp, the rate detection unit 220 may:
  (1) read the current value $L_1$ of the local clock;
  (2) read the local clock value $L_0$ that was previously stored in timestamp field 410D;
  (3) compute the data rate estimate for stream $X_k$ based on the expression $$DRE(k)=R_S*G*Count(k)/(L_1-L_0),$$

where G is the number of bits per packet, and Count(k) is the current count value for stream $X_k$;
  (4) set the state value to EST and the count value to one.

(D) If the rate detection unit 220 determines that the current packet does contain a timestamp, the rate detection unit 220 may set the state value to PCR0 and the count value to one.

In one set of embodiments, the local clock may have a clock rate that is nominally equal to the rate specified for Program Clock Reference (PCR) clocks given by the ISO/IEC 13818-1 standard for MPEG-2.

In the state EST, the rate detection unit 220 may increment the count value for each received packet of stream $X_k$. If the received packet contains a timestamp value ($TS_{pkt}$), the timestamp value is stored into the timestamp field 410D of the data record corresponding to stream $X_k$, the state value is set to PCR0, and the count value is set to one. Thus, for the next received packet of stream $X_k$, the rate detection unit 220 will be in state PCR0.

In the state EST, if the count value reaches $N_{MAX}$, the rate detection unit 220 sets the count value to zero, sets the state value to IDLE, and notifies the host computer 120 (e.g., by asserting an interrupt to the host CPU) that a "packet missed" error has occurred.

As described above, in state PCR0, the rate detection unit 220 increments the count value for each received packet of stream $X_k$. If a timestamp-bearing packet is received, the rate detection unit resets the count to one, computes a data rate estimate for stream $X_k$ and transitions to state PCR1. If, in state PCR0, the count value reaches $N_{MAX}$, the rate detection unit may reset the count to zero, set the state value to IDLE, and notify the host computer 120 that a "packet missed" error has occurred.

As described above, the input unit 210 provides a type indicator per packet to the rate detection unit 220. In any of states IDLE, EST, PCR0 or PCR1, the rate detection unit 220 may compare the type indicator of the current packet to a type indicator Type(k) for stream $X_k$. If the type indicator of the current packet is different from the type indicator Type(k), the rate detection unit may set the count value for stream $X_k$ to zero and set the state value for stream $X_k$ to IDLE. The type indicator Type(k) is established by control information embedded in the packet header.

In one set of embodiments, the transitions between the states IDLE, EST, PCR0 and PCR1 of FIG. 4 may be summarized as follows:

A=No timestamp acquired in last $N_{BUF}/2$ packets
B=Detected first timestamp
C=!A && !B||NewType
D=(No timestamp acquired in last $N_{MAX}$ packets)||NewType
E=!B && !D
F=(Detected second timestamp) && (No discontinuity) && (Count>$N_{MIN}$)
G=!F && !D
H=!D The notation "!" denotes the logical negation operator. The notation "&&" denotes the logical AND operator. The notation "||" denotes the logical OR operator.

Figure 5:
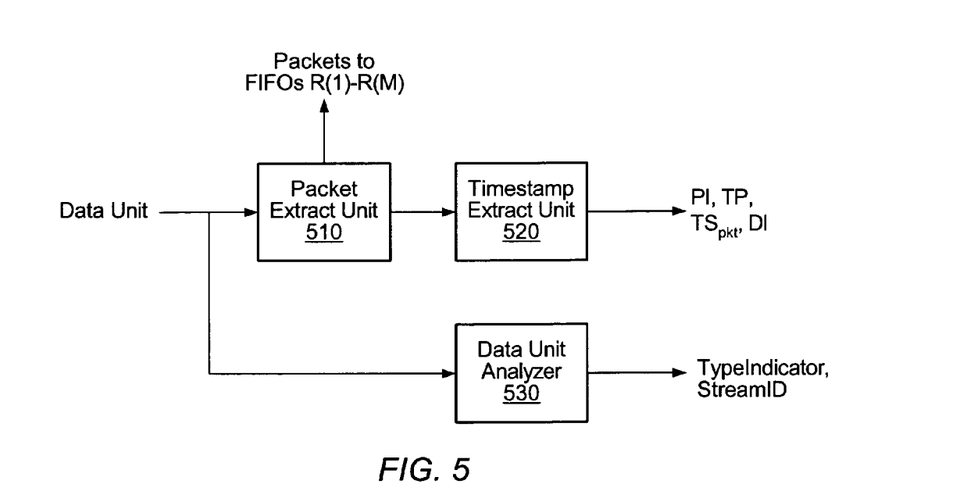
FIG. 5 illustrates one embodiment of the input unit 210 which is configured to extract packets from a received sequence of data units (e.g., Internet Protocol datagrams) packets.

FIG. 5 illustrates one embodiment of input unit 210. The input unit 210 may include a packet extraction unit 510, a timestamp extraction unit 520 and a data unit analyzer 530.

The input unit 210 receives a sequence of data units (e.g., Internet Protocol datagrams). Data unit analyzer 530 examines each data unit to determine a stream identifier (ID) and a type indicator associated with packets in the data unit. The streamID indicates which source data stream the data unit belongs to.

The data unit analyzer 530 provides the streamID and the type indicator to the rate detection unit 220 per packet.

Packet extraction unit 510 extracts packets (e.g., MPEG-2 transport stream packets) from the data unit and forwards the packets to one of the input FIFOs R(1), R(2), ..., R(M), i.e., to the input FIFO that has been assigned to the streamID of the present data unit. Each of the extracted packets are also made available to the timestamp extraction unit 520. For each extracted packet, the timestamp extraction unit 520 determines if the packet contains a timestamp field and extracts the value of the timestamp field if the packet contains a timestamp field. The timestamp extraction unit 520 may also determine if the current packet represents a stream discontinuity in the stream indicated by the streamID. Thus, for each extracted packet, the timestamp extraction unit 520:

asserts a packet indicator (PI) signal (used to support the packet count function of the rate detection unit 220);
asserts a timestamp present (TP) signal if a timestamp is present in the present packet;
outputs the timestamp value ($TS_{pkt}$) if present in the present packet; and
outputs a discontinuity indicator (DI) indicating whether or not a discontinuity occurred at the present packet.

Figure 6:
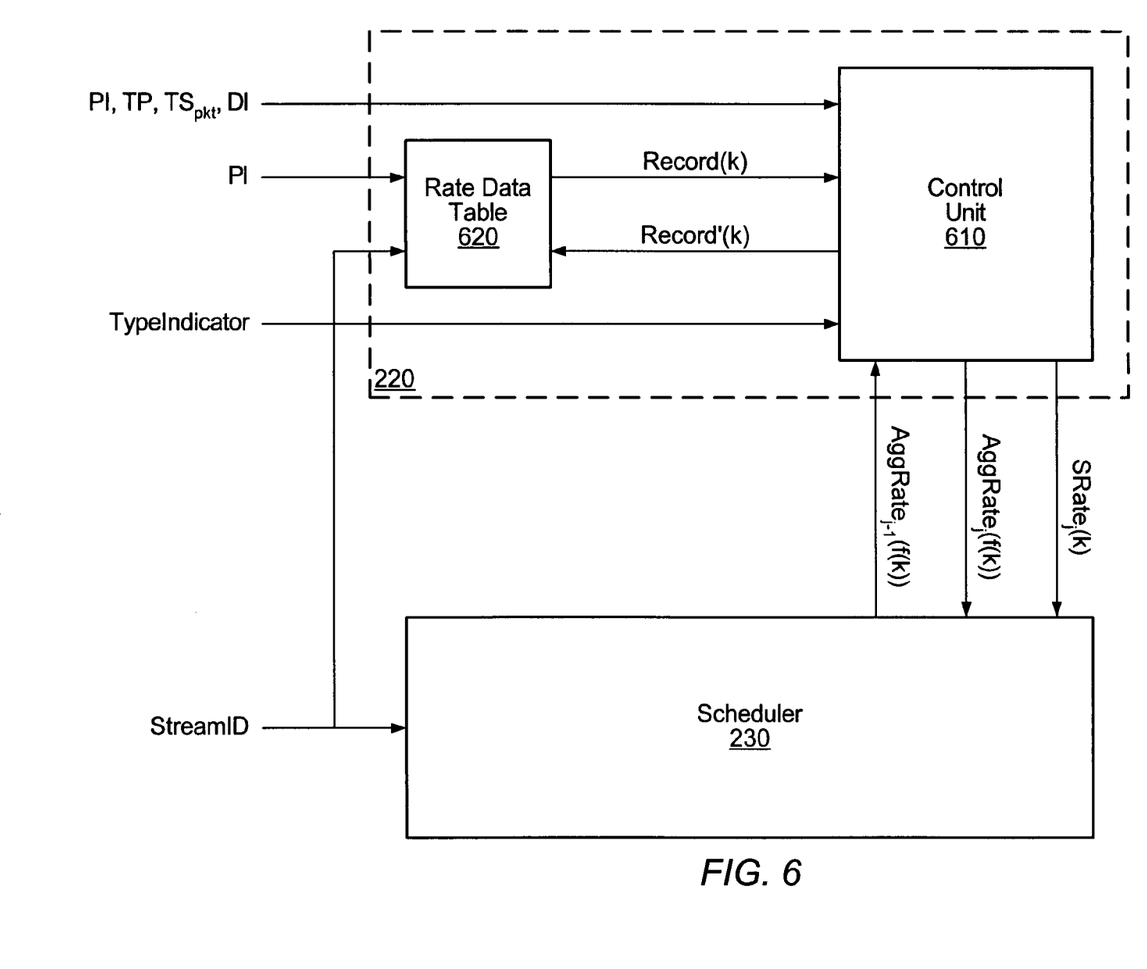
FIG. 6 illustrates one embodiment of the rate detection unit 220 which includes a rate data table 620 and a control unit 610.

FIG. 6 illustrates one embodiment of rate detection unit 220. The rate detection unit 220 includes a control unit 610 and a rate data table 620 (as described above).

The control unit 610 is configured to implement the computations described above in connection with FIG. 4 (i.e., the state diagram) for each source data stream. To facilitate these computations, the control unit 610 receives:

the packet indicator signal (PI),
the timestamp present signal (TP),
the timestamp value ($TS_{pkt}$) if present in the current packet,
the discontinuity indicator (DI),
the type indicator, and
the streamID (indicating the source data stream $X_k$ to which the current packet belongs)

from the input unit 210. The streamID is also provided to the scheduler 230.

In response to an assertion of the packet indicator signal (PI), the rate data table 620 transfers to control unit 610 the contents of the data record corresponding to the stream $X_k$ indicated by the streamID. This data record is denoted as Record(k). The control unit 610 computes updated information to be stored in the same data record. Thus, in the diagram, the updated information is denoted as Record'(k).

Record(k) may include the enable bit 410A, the state value 410B, the count value 410C, the timestamp value 410D and the scheduling rate value 410E as described above in connection with FIG. 3.

Record'(k) may include, the state value 410B, the count value 410C, the timestamp value 410D and the scheduling rate value 410E, or, different subsets of these values at different times.

Whenever the control unit 610 computes a data rate estimate DRE(k) for the stream $X_k$, the control unit further computes an updated scheduling rate $SRate_j(k)$ and an updated aggregate rate $AggRate_j(f(k))$, as described above, based on: the data rate estimate DRE(k), a previous aggregate rate $AggRate_{j-1}(f(k))$, and a previous scheduling rate $SRate_{j-1}(k)$. The previous aggregate rate $AggRate_{j-1}(f(k))$ is provided by the scheduler 230. The previous scheduling rate $SRate_{j-1}(k)$ is provided as part of Record(k) from the rate data table 620. The updated scheduling rate $SRate_j(k)$ and the updated aggregate rate $AggRate_j(f(k))$ are provided to the scheduler 230. The updated scheduling rate $SRate_j(k)$ is also transferred to the rate data table as part of Record'(k).

Figure 7:
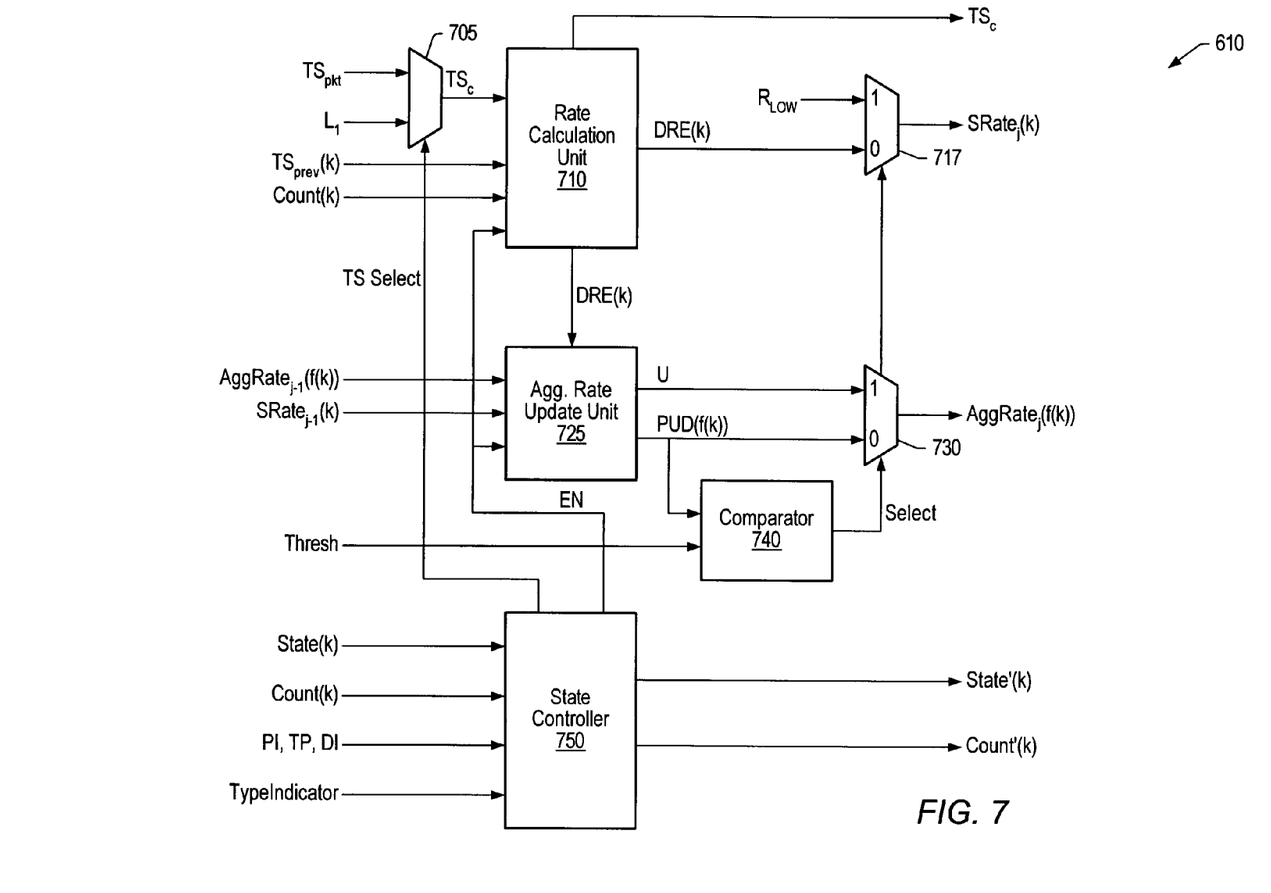
FIG. 7 illustrates one embodiment of the control unit 610.

FIG. 7 illustrates one set of embodiments of control unit 610.

Control unit 610 may include a rate calculation unit 710, an aggregate rate update unit (ARUU) 725, a comparator 740 and a state controller 750. In addition, the control unit 610 may include multiplexer 705, multiplexer 717, and multiplexer 730.

State controller 750 receives a current state value State(k) and a current count value Count(k) for the stream $X_k$ corresponding to the current packet from the rate data table 620, and receives the packet indicator signal (PI), the timestamp present signal (TP), the discontinuity indicator (DI) and type indicator from the input unit 210.

The state controller 750 generates an update State'(k) for the state value and an update Count'(k) for the count value of the stream $X_k$ corresponding to the current packet, as described above in connection with FIG. 4 (i.e., the state diagram). The updated values State'(k) and Count'(k) are transferred to the rate data table 620, to be stored in the data record corresponding to stream $X_k$. The state controller 750 determines when the conditions (as discussed above in connection with the state diagram of FIG. 4) are satisfied for a data rate estimate to be generated. When the conditions are satisfied, the state controller 750 asserts an enable signal (EN).

The rate calculation unit 710 computes the data rate estimate DRE(k) for stream $X_k$ in response to the enable signal (EN). The data rate estimate DRE(k) is computed according to the expression $$DRE(k) = R_S * G * Count(k)/(TS_c - TS_{prev}(k)),$$

where $TS_{prev}(k)$ is the value of the timestamp field 410D received from the rate data table as part of Record(k), where $TS_c$ is the current timestamp provided at the output of multiplexer 705, where G is the number of bits per packet, where $R_S$ is the rate of source clock (in the encoder) from which the timestamps were derived. The data rate estimate DRE(k) is supplied to multiplexer 717 and to the ARUU 725.

Multiplexer 705 selects as the current timestamp $TS_c$ either the timestamp value $TS_{pkt}$ extracted from the current packet, or, the current value $L_1$ of the local clock. This selection is determined by the TS Select input which is controlled by state controller 750. The current timestamp value $TS_c$ may be written back into the rate data table as part of Record'(k), i.e., the timestamp field of Record'(k).

The value $TS_{prev}(k)$ received from the timestamp field 410D of the Record(k) is either the previous timestamp value $TS_0$ (extracted from a previous packet), or, the previous value $L_0$ of the local clock. In the case where multiplexer 705 selects $TS_{pkt}$, the value $TS_{prev}(k)$ is the previous timestamp value $TS_0$. In the case where multiplexer 705 selects the current local value $L_1$, the value $TS_{prev}(k)$ is the previous local value $L_0$. The state controller 750 guarantees this consistency. Thus, the value DRE(k) computed by the rate calculation unit 710 may be the data rate estimate based on the local clock samples, or, the data rate estimate based on the successive timestamps, as determined by the state controller 750.

Multiplexer 717 selects one of $R_{LOW}$ or DRE(k) based on the value of the Select line which is controlled by comparator 740. The output of multiplexer 717 is the updated scheduling rate $SRate_j(k)$. Thus, multiplexer implements the logic $$SRate_j(k) = (Select)?R_{LOW}:DRE(k).$$

The ARUU 725 generates the provisional update value PUD(f(k)) and the alternative update value U for the output channel $CH_{f(k)}$, i.e., the output channel to which the stream $X_k$ has been assigned, in response to the enable signal (EN) asserted by the state controller 750. The provisional update value PUD(f(k0)) and the alternative update value U are supplied to the multiplexer 730. The provisional update value PUD(f(k)) is also supplied to the comparator 740.

To facilitate computation of the provisional update value PUD(f(k)) and the alternative update value U, the ARUU 725 receives the previous aggregate rate $AggRate_{j-1}(f(k))$ for the output channel $CH_{f(k)}$ from the scheduler 230 and the previous scheduling rate $SRate_{j-1}(k)$ as part of Record(k) from the rate data table.

Comparator 740 performs a comparison operation on the update value PUD(f(k)) and the rate threshold value ("Thresh" in FIG. 7). If the update value PUD(f(k)) is greater than or equal to the rate threshold value, the Select output line may be set to a logical one value. However, if the update value PUD(f(k)) is less than the rate threshold value, the Select output line may be set to a logical zero value.

Multiplexer 730 selects one of U or PUD(f(k)) based on the value of the Select line. The output of multiplexer 730 is the updated aggregate rate $AggRate_j(f(k))$. Thus, multiplexer 730 implements the logic:

$$AggRate_j(f(k)) = (Select)?U:PUD(f(k)).$$

In some embodiments, scheduler 230 may read each input FIFO R(k), k=1, 2, . . . , M, with a period determined by a value PSP(k) which is proportional to the inverse of the scheduling rate for the corresponding source data stream $X_k$. (PSP is an acronym for "packet scheduling period".) Thus, rate detection unit 220 may be configured to provide PSP values instead of scheduling rates to scheduler 230.

In one embodiment, the rate detection unit 220 computes the value PSP(k) according to the relation $$PSP(k) = (PUD(f(k)) \geq Thresh)?MOR_{f(k)}/R_{LOW}: MOR_{f(k)}/DRE(k).$$

Figure 8:
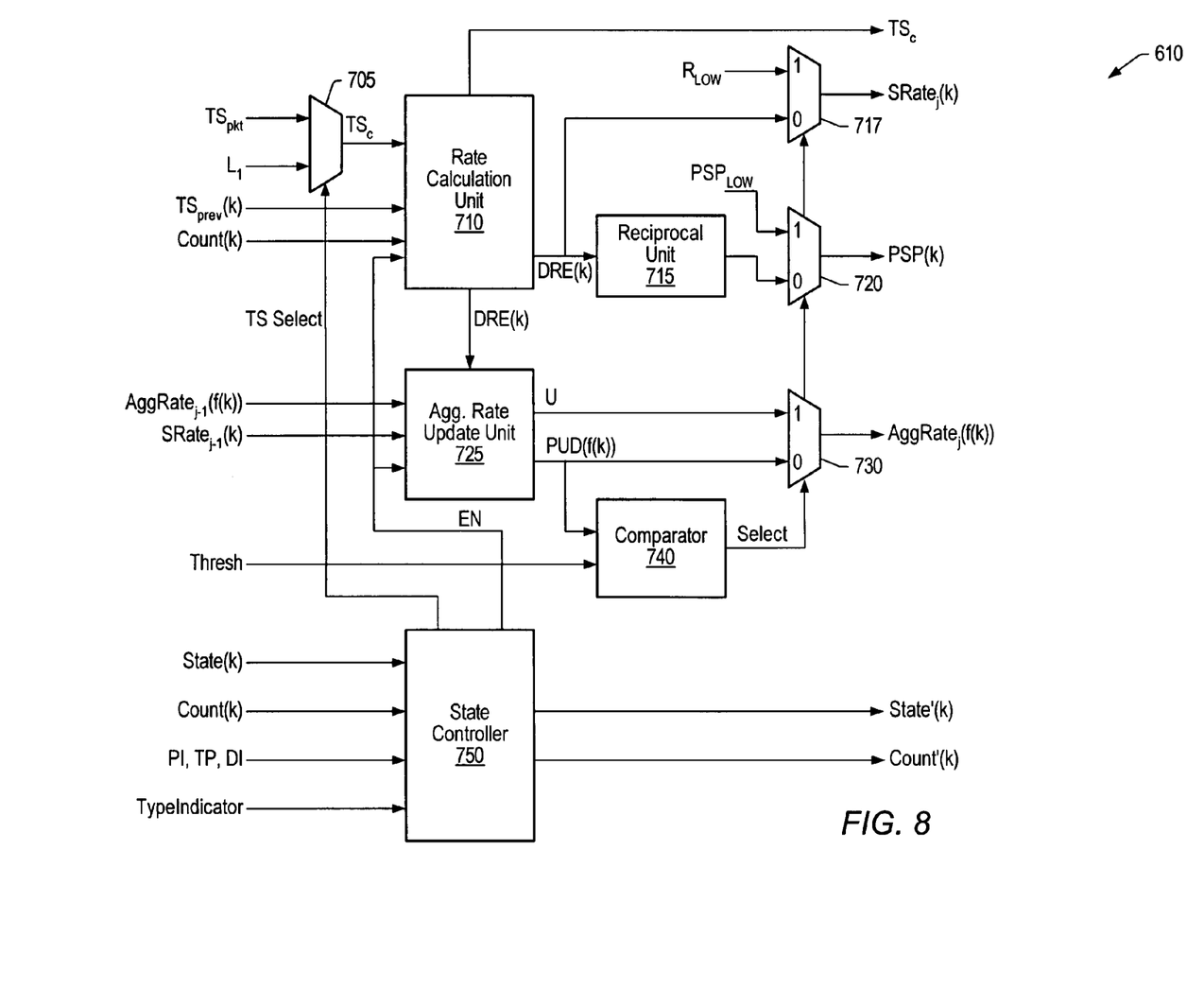
FIG. 8 illustrates another embodiment of the control unit 610.

In this embodiment, the control unit 610 may be configured, as illustrated in FIG. 8, to include a reciprocal unit 715 and a multiplexer 720 in addition to those elements illustrated in the control unit of FIG. 7.

The reciprocal unit 715 computes the value $H = MOR_{f(k)}/DRE(k)$, where $MOR_{f(k)}$ is the maximum output rate of the output channel $CH_{f(k)}$ corresponding to the stream $X_k$. The value H is supplied to multiplexer 720.

Multiplexer 720 selects one of the value H or the constant $PSP_{LOW}$ based on the value of the Select line which is controlled by comparator 740. The output of multiplexer 720 is the value PSP(k). Thus, multiplexer 720 implements the logic:

$$PSP(k) = (Select)?PSP_{LOW}:H.$$

The constant $PSP_{LOW}$ equals $MOR_{f(k)}/R_{LOW}$.

Figure 9:
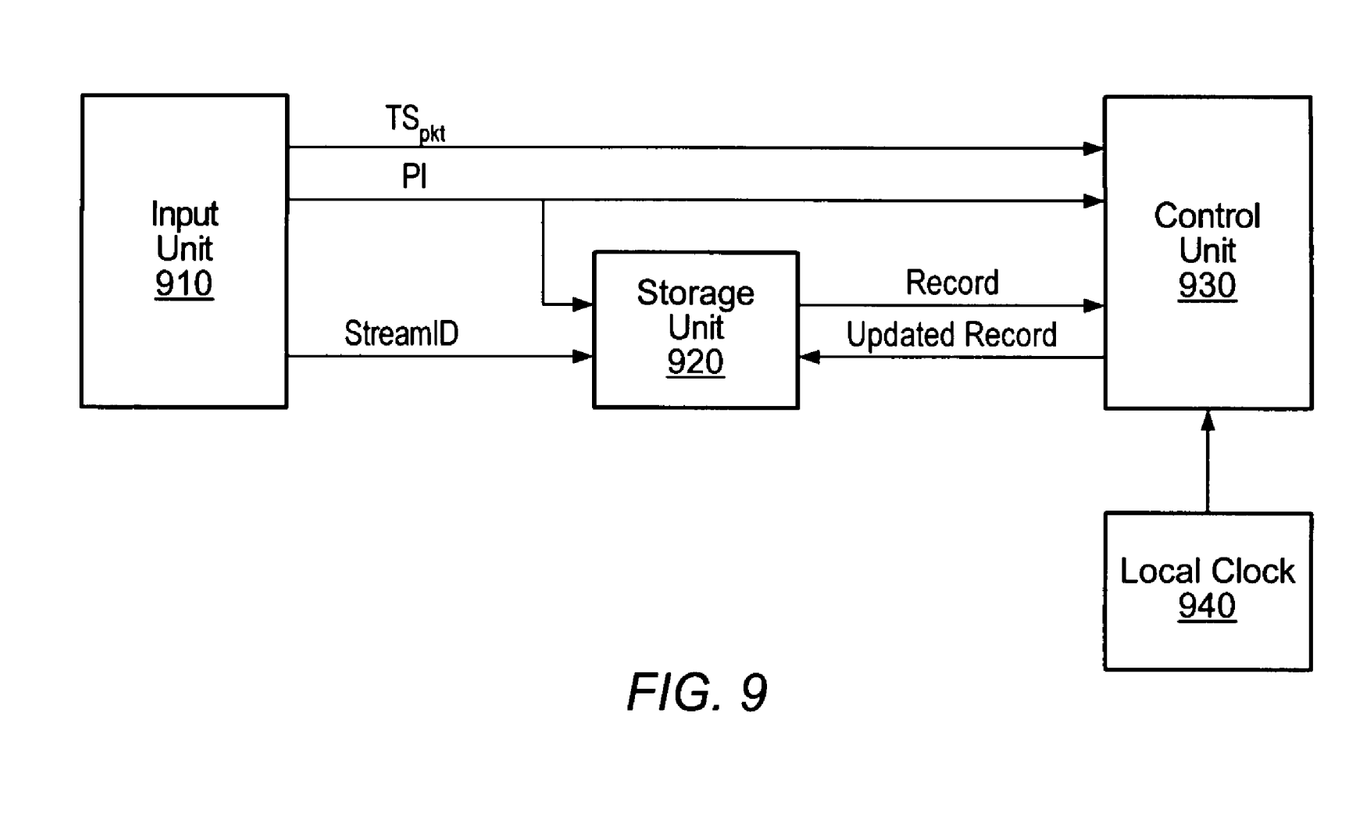
FIG. 9 illustrates one set of embodiments of a system for estimating the input data rate of a data stream.

In one set of embodiments, a system 900 (e.g., a multiplexing system) may include an input unit 910, a storage unit 920 and a control unit 930 as illustrated in FIG. 9. The input unit 910 may be configured to receive a sequence of data units corresponding to a plurality of source data streams, to extract packets of the source data streams from the data units, to extract a timestamp value ($TS_{pkt}$) from each packet that contains a timestamp field, to assert a packet indication (PI) signal for each packet, and to generate a stream identifier (ID) for each packet that identifies the source data stream to which the packet belongs.

The storage unit 920 may be configured to store a number of data records. Each data record may be configured to store information associated with a corresponding one of the source data streams. Each data record includes at least a count field and a timestamp field. The count field of each data record is configured to store a value representing a number of packets of the corresponding source data stream that have been received since a packet containing a timestamp was received.

The control unit 930 may be configured to compute a data rate estimate for a first of the source data streams in response to a determination that a current packet contains a second of two consecutive timestamp values corresponding to the first source data stream. The control unit may be configured to compute the data rate estimate based on (a) the value of the count field corresponding to the first source data stream, (b) a first of the two consecutive timestamp values stored in the timestamp field corresponding to the first source data stream, and (c) the second timestamp value from the current packet.

The data rate estimate is usable to determine a rate of allocation of packets from the first source data stream into a multiplexed output stream which is to be transmitted onto an output channel.

The source data streams may be MPEG-2 transport streams. The timestamp values may be program clock reference (PCR) timestamps.

The control unit 930 may be configured to store the timestamp values corresponding to the first source data stream into the timestamp field of the corresponding data record at least until the data rate estimate has been computed.

The control unit 930 may be configured to increment the count field of the data record corresponding to the first source data stream in response to receiving each packet of the first source data stream. Furthermore, the control unit may be configured to reinitialize the value of the count field in response to a determination that the value of the count field has reached a predetermined maximum value.

In one embodiment, the control unit 930 may be configured to verify that the count value exceeds a minimum value before computing the data rate estimate.

The control unit 930 may be configured to compute a scheduling rate for the first source data stream in response to having computed the data rate estimate. The scheduling rate may be used to control the rate of allocation of packets from the first source data stream into the multiplexed output stream.

In one embodiment, the control unit 930 may be configured to compute the scheduling rate for the first source data stream according to the relations:

$$PUD = AggRate_{j-1} - SRate_{j-1}(k) + DRE(k),$$

$$SRate_j(k) = (PUD \geq Thresh)?R_{LOW}:DRE(k),$$

where $AggRate_{j-1}$ is a previous aggregate rate for the output channel, where $SRate_{j-1}(k)$ is a previous scheduling rate for the first source data stream, where $DRE(k)$ is the data rate estimate for the first source data stream, where Thresh is a rate threshold value;

where $R_{LOW}$ is a low rate value constant, where $SRate_j(k)$ is the scheduling rate for the first source data stream.

Furthermore, the control unit 930 may be configured to compute an updated aggregate rate for the output channel based on the relations:

$$U = AggRate_{j-1} - SRate_{j-1}(k) + R_{LOW}$$

$$AggRate_j = (PUD \geq Threshold)?U:PUD.$$

In some embodiments, the control unit 930 is configured to reset the count value corresponding the first source data stream to an initial value in response to a determination that a type of the current packet differs from a type associated with the first data stream. A type difference may indicate a change in rate of the source data stream, e.g., associated with a change from normal play to fast forward or reverse.

The multiplexing system may also include a local clock 940. The control unit may be configured to compute a temporary data rate estimate for the first source data stream based on samples of a local clock in response to a determination that the count value for the first source data stream has reached a predetermined number.

In one embodiment, the control unit 930 may be configured to store a first local timestamp, derived from a first sample of the local clock, into the timestamp field corresponding to the first source data stream, in response to an indication that the count value for the first source data stream equals zero. Furthermore, the control unit may be configured to:

generate a second local timestamp, derived from a second sample of the local clock, in response a determination that the count value for the first source data stream has reached the predetermined number; and compute the temporary data rate estimate based on the first local timestamp, the second local timestamp and the count value for the first source data stream.

The multiplexing system may also include a scheduler, a set of input FIFOs, and an output FIFO (e.g., as shown in FIG. 2). Each of the input FIFOs may store packets of a corresponding one of the source data streams. The scheduler may be configured to read packets from each of the input FIFOs and store the packets into the output FIFO to form the multiplexed output stream.

The multiplexing system may also include a transmit unit configured to transmit the multiplexed output stream from the output FIFO onto the output channel. The output channel may be a quadrature amplitude modulation (QAM) output channel.

In another set of embodiments, a multiplexing system may include a rate calculation unit, a first output multiplexer, an aggregate rate update unit, and a comparator (e.g., as illustrated in FIGS. 7 and 8). The rate calculation unit may be configured to generate a data rate estimate in response to receiving a current timestamp value $TS_C$ selected by the input multiplexer, a previously stored timestamp value $TS_{prev}$ and a packet count value C, where the data rate estimate is a value proportional to $C/(TS_C - TS_{prev})$.

The aggregate rate update unit may be configured to compute a provisional update value PUD and an alternative update value U in response to receiving a previous aggregate rate $AggRate_{j-1}$ and a previous scheduling rate $SRate_{j-1}$. The comparator may be configured to compare the provisional update value PUD to a rate threshold value and to drive a select output line based on a result of said comparison. The first output multiplexer may be configured to select one of a low rate constant and the data rate estimate based on a value of the select output line.

The multiplexing system may also include a second output multiplexer. The second output multiplexer may be configured to select one of the alternative update value U or the provisional update value PUD based of the value of the select line.

The aggregate rate update unit may compute the provisional update PUD and the alternative update value U according to the relations $$PUD = AggRate_{j-1} - SRate_{j-1} + DRE$$

$$U = AggRate_{j-1} - SRate_{j-1} + R_{LOW},$$

where DRE is the data rate estimate and $R_{LOW}$ is the low rate constant.

The multiplexing system may additionally include an input multiplexer. The input multiplexer may be configured to select one of (a) a timestamp associated with a current input packet and (b) a timestamp derived from a sample of a local clock. The value selected by the input multiplexer is supplied to the rate calculation unit as the current timestamp value $TS_C$.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as a network and/or a wireless link.

The various methods as illustrated in the Figures and described herein represent exemplary embodiments of methods. The methods may be implemented in software, hardware, or a combination thereof. The order of method steps may be changed, and various steps may be added, reordered, combined, omitted, modified, etc.

Various modifications and changes may be made as would be obvious to a person skilled in the art having the benefit of this disclosure. It is intended that the invention embrace all such modifications and changes and, accordingly, the above description is to be regarded in an illustrative rather than a restrictive sense.

What is claimed is:

1. A system comprising: an input unit configured to receive a sequence of data units that contain packets from a plurality of source data streams, to extract the packets of the source data streams from the data units, to extract a timestamp value from each of the packets that contains a timestamp field, to assert a packet indication signal for each of the packets, and to generate a stream identifier for each of the packets that identifies the source data stream to which the packet belongs, wherein each of the data units of said sequence includes a corresponding header and at least one packet from at least one of the plurality of source data streams;

a storage unit configured to store a number of data records, wherein each data record is configured to store information associated with a corresponding one of the source data streams, wherein each data record includes at least a count field and a timestamp field, wherein the count field of each data record is configured to store a value representing a number of packets of the corresponding source data stream that have been received since a packet containing a timestamp was received in the corresponding source data stream;

a control unit configured to compute a data rate estimate for a first of the source data streams in response to a determination that a current packet contains a timestamp value that is a second of two consecutive timestamp values corresponding to the first source data stream, wherein the control unit is configured to compute the data rate estimate based on (a) the value of the count field corresponding to the first source data stream, (b) a first of the two consecutive timestamp values that is stored in the timestamp field corresponding to the first source data stream, and (c) the second timestamp value from the current packet;

wherein the data rate estimate is usable to determine a rate of allocation of packets from the first source data stream into a multiplexed output stream which is to be transmitted onto an output channel;

wherein the control unit is configured to compute the scheduling rate for the first source data stream according to the relations:

$PUD = AggRate_{j-1} - SRate_{j-1}(k) + DRE(k)$, $SRate_j(k) = PUD \geq Thresh ? R_{LOW} : DRE(k)$, wherein PUD is a provisional update value;
wherein $AggRate_{j-1}$ is a previous aggregate rate for the output channel;
wherein $SRate_{j-1}(k)$ is a previous scheduling rate for the first source data stream;
wherein $DRE(k)$ is the data rate estimate for the first source data stream;
wherein Thresh is a rate threshold value;
wherein $R_{LOW}$ is a low rate value constant;
wherein $SRate_j(k)$ is the scheduling rate for the first source data stream.

2. The system of claim 1, wherein the timestamp values are program clock reference (PCR) timestamps.

3. The system of claim 1, wherein the source data streams are MPEG-2 transport streams.

4. The system of claim 1, wherein the control unit is configured to store the timestamp values corresponding to the first source data stream into the timestamp field of the corresponding data record at least until the data rate estimate has been computed.

5. The system of claim 1, wherein the control unit is configured to increment the count field of the data record corresponding to the first source data stream in response to receiving each packet of the first source data stream.

6. The system of claim 5, wherein the control unit is configured to reinitialize the value of the count field in response to a determination that the value of the count field has reached a predetermined maximum value.

7. The system of claim 5, wherein the control unit is configured to verify that the count value exceeds a minimum value before computing the data rate estimate.

8. The system of claim 1, wherein the control unit is configured to compute a scheduling rate for the first source data stream in response to having computed the data rate estimate, wherein the scheduling rate controls the rate of allocation of packets from the first source data stream into the multiplexed output stream.

9. The system of claim 1, wherein the control unit is further configure to compute an updated aggregate rate for the output channel based on the relations:

$U = AggRate_{j-1} - SRate_{j-1}(k) + R_{LOW}$ $AggRate_j = (PUD \geq Threshold) ? U : PUD$.

10. The system of claim 1, wherein the control unit is configured to reset the count value corresponding the first source data stream to an initial value in response to a determination that a type of the current packet differs from a type associated with the first data stream.

11. The system of claim 1 further comprising a local clock, wherein the control unit is configured to compute a temporary data rate estimate for the first source data stream based on samples of a local clock in response to a determination that the count value for the first source data stream has reached a predetermined number.

12. The system of claim 11, wherein the control unit is configured to store a first local timestamp, derived from a first sample of the local clock, into the timestamp field corresponding to the first source data stream, in response to an indication that the count value for the first source data stream equals zero.

13. The system of claim 12, wherein the control unit is configured to:
generate a second local timestamp, derived from a second sample of the local clock, in response a determination that the count value for the first source data stream has reached the predetermined number; compute the temporary data rate estimate based on the first local timestamp, the second local timestamp and the count value for the first source data stream.

14. The system of claim 1 further comprising: a scheduler, a set of input FIFOs, and an output FIFO, wherein each of the input FIFOs is configured to store packets of a corresponding one of the source data streams, wherein the scheduler is configured to reads packets from each of the input FIFOs and store the packets into the output FIFO to form the multiplexed output stream.

15. The system of claim 14 further comprising a transmit unit configured to transmit the multiplexed output stream from the output FIFO onto the output channel.

16. The system of claim 1, wherein the output channel is a quadrature amplitude modulation (QAM) output channel.

17. The system of claim 1, wherein each data record also includes a state field, wherein the control unit is configured to examine data including a value of the state field corresponding to the first source data stream in order to determine that the timestamp value of the current packet is the second of two consecutive timestamp values of the first source data stream.

18. A system comprising: a rate calculation unit; first output multiplexer; an aggregate rate update unit; and a comparator; wherein the rate calculation unit is configured to generate a data rate estimate in response to receiving a current timestamp value $TS_C$ selected by an input multiplexer, a previously stored timestamp value $TS_{prev}$ and a packet count value C, wherein the data rate estimate is a value proportional to $C/(TS_C-TS_{prev})$;

wherein the aggregate rate update unit is configured to compute a provisional update value PUD and an alternative update value U in response to receiving a previous aggregate rate ($AggRate_{j-1}$) and a previous scheduling rate ($SRate_{j-1}$);

wherein the comparator is configured to compare the provisional update value PUD to a rate threshold value and to drive a select output line based on a result of said comparison;

wherein the first output multiplexer is configured to select one of a low rate constant and the data rate estimate based on a value of the select output line;

wherein the aggregate rate update unit computes the provisional update value PUD and the alternative update value U according to the relations:

$PUD = AggRate_{j-1} - SRate_{j-1} + DRE$ $U = AggRate_{j-1} - SRate_{j-1} + R_{LOW}$, wherein DRE is the data rate estimate and $R_{LOW}$ is the low rate constant.

19. The system of claim 18 further comprising a second output multiplexer, wherein the second output multiplexer is configured to select one of the alternative update value U or the provisional update value PUD based of the value of the select line.

20. The system of claim 18 further comprising an input multiplexer, wherein the input multiplexer is configured to select one of (a) a timestamp associated with a current input packet and (b) a timestamp derived from a sample of a local clock, wherein the value selected by the input multiplexer is supplied to the rate calculation unit as the current timestamp value $TS_C$.

* * * * *